| United States Patent [19] | [11] | 4,094,690 |
|---|---|---|
| Morton | [45] | June 13, 1978 |

[54] LIQUID COMPOSITION

[75] Inventor: Michael John Morton, Runcorn, England

[73] Assignee: Imperial Chemical Industries Limited, London, England

[21] Appl. No.: 718,463

[22] Filed: Aug. 30, 1976

Related U.S. Application Data

[62] Division of Ser. No. 382,198, Jul. 24, 1973, Pat. No. 3,994,740.

[30] Foreign Application Priority Data

Aug. 7, 1972 United Kingdom .............. 36693/72

[51] Int. Cl.$^2$ .............................................. C04B 35/10
[52] U.S. Cl. .................................. 106/73.4; 106/73.5; 264/0.5; 264/63; 264/65; 264/DIG. 19
[58] Field of Search .................... 264/63, 65, DIG. 19, 264/0.5; 106/73.4, 73.5, 65; 252/301.1 R

[56] References Cited

U.S. PATENT DOCUMENTS

| 3,821,070 | 6/1974 | Mansmann et al. ................ 264/63 |
| 3,846,527 | 11/1974 | Winter et al. ..................... 264/63 |
| 3,865,599 | 2/1975 | Mansmann et al. ............... 106/73.4 |
| 3,907,054 | 9/1975 | Mansmann et al. .................. 264/63 |
| 3,992,498 | 11/1976 | Morton et al. ..................... 264/63 |

FOREIGN PATENT DOCUMENTS

| 955,916 | 4/1964 | United Kingdom. |
| 1,015,611 | 1/1966 | United Kingdom. |

*Primary Examiner*—Benjamin R. Padgett
*Assistant Examiner*—Deborah L. Kyle
*Attorney, Agent, or Firm*—Cushman, Darby & Cushman

[57] ABSTRACT

A liquid composition comprising a solution of a water-soluble metal compound convertible to metal oxide and a smaller amount of a hydrolytically stable water-soluble organic silicone which may be used to prepare binders, coatings and shaped bodies, especially fibres, of intimate mixtures of metal oxide and silica. Preferred silicones are polysiloxane, polyoxyalkylene copolymers and preferred metal compounds are salts of aluminium and zirconium. Phase-stabilised alumina, especially in the form of fibres, is a particularly important embodiment; transitional alumina can be stabilised up to 1400° C without the appearance of separate phases of mullite and crystalline silica.

32 Claims, No Drawings

LIQUID COMPOSITION

This is a division, of application Ser. No. 382,198 filed July 24, 1973, now Pat. No. 3,994,740.

This invention relates to a liquid composition and in particular to a liquid composition comprising a metal compound and an organic silicon compound suitable for the preparation of shaped bodies especially fibres, coatings, foams and binders comprising a metal oxide and silica.

Compositions comprising precursors of metal oxide and inorganic precursors of silica, for example hydrated silica sols, are known, and have served to produce metal oxide solids, notably alumina and zirconia, containing dispersed silica. It is also known that dispersed silica has an effect on the phase change properties of alumina. With known processes for incoporating silica into alumina, a significant effect on the stabilisation of transitional alumina phases is not achieved at high temperatures. Suppression of the appearance of the alpha form of alumina at 1400° C can be achieved only by adding sufficient silica so that the major phase present is crystalline aluminosilicate (mullite). We have now found that surprisingly metal oxide solids containing dispersed silica may be produced from compositions comprising precursors of metal oxides and organic silicon compounds. The stabilisation of alumina phases for example can thereby be effected at temperatures at which stabilisation was previously not possible. Furthermore stabilisation at lower temperatures can be achieved with lower proportions of silica than hitherto possible.

According to the present invention there is provided a liquid composition comprising an aquous solution of a water-soluble metal compound decomposable or reactable to produce a metal oxide and of a water-soluble organic silicon compound which is hydrolytically stable in the liquid composition and in which the silicon atoms are attached to carbon atoms directly or through an oxygen atom wherein the concentration of the metal compound expressed as equivalent metal oxide exceeds the concentration of the silicon compound expressed as silicon dioxide.

By solution is meant a true solution or a colloidal solution.

Compositions according to the invention are capable of being converted, for example by heating to solids comprising one or more metal oxides and silica which are suitable for use in the form of foams, binders, coatings, granules, cenospheres, films and especially fibres.

The relative concentrations of metal compound and organic silicon compound may be varied over wide limits, for example from 1% by weight of silicon compound to 99% by weight of metal compound or from 1% by weight of metal compound to 99% by weight of silicon compound. Preferably the weight ratio of the equivalent metal oxide to the equivalent $SiO_2$ is at least 85:15.

The metal of the metal compound may be selected from the elements of the Periodic Table having an atomic number of 4, 12, 13, 20 to 32, 38 to 42, 44 to 51, 56 to 60, 62 to 83, 90, 92 or 94. The metals Al, Fe, Zr, Ti, Be, Cr, Mg, Th, U, Y, Ni, V, Mg, Mo, W and Co or mixtures thereof are preferred: the metals Al, Fe, Zr, Ti and Th and more particularly Al are especially preferred for fibres made from the compositions.

The anionic constituent of the metal compound may also be selected from a wide range. Two or more compounds of the same or different metals may be used, if desired. Simple inorganic compounds including the hydroxides; the halides and oxyhalides, especially chlorides and oxychlorides; carbonates; nitrates; phosphates; and sulphates are useful. Salts of organic acids such as neutral or basic acetates, oxalates, propionates, or formates or organo-metallic compounds are also suitable. Basic salts are preferred as they polymerise in solution. Especially preferred are metal compounds which can form a refractory oxide, especially aluminium oxychloride, basic aluminium acetate, basic aluminium formate, zirconium oxychloride, basic zirconium acetate, basic zirconium nitrate or basic zirconium formate, mixtures thereof or mixed salts thereof.

The metal compound is most conveniently decomposable to the metal oxide by heating, usually at a temperature from 200° to 1000° C. Carbides of the metals may be formed by including carbon or a carbonaceous material in the composition which, on heating for example, reacts with the metal compound or a reaction product thereof. In an analogous fashion, nitrides can be formed by including nitrogen-containing compounds in the composition. Reaction to form carbides or nitrides may also be brought about by the action of carbon- or nitrogen-containing gases on the metal oxide.

The water-solubility of the organic silicon compound is preferably sufficiently high to provide a concentration of at least 0.1% by weight expressed as $SiO_2$ dissolved in the liquid composition. The water solubility may be increased by the inclusion of a water-miscible organic solvent, for example an alcohol, in the liquid composition.

The silicon compound is preferably a compound containing a monomeric or polymeric siloxane, silanol or silanolate group, and/or a water-solubilising carbon functional group. By water-solubilising carbon functional group is meant a group whch is attached to the compound through carbon and which confers water-solubility on an otherwise relativey insoluble compound. Examples of such goups are amine, amide, ester alcohol, ether and carboxyl groups. More preferably the silicon compound is selected from water-soluble polysiloxane-polyoxyalkylene copolymers. Such copolymers may conveniently be divided into those in which the polymer blocks have Si—C linkages and those in which the polymer blocks have Si—O—C linkages. Si—C linkages are preferred as copolymers having such linkages are more stable to hydrolysis than those having Si—O—C linkages.

The polysiloxane blocks used in the copolymers preferably contains at least two siloxane groups of the general type $R_bSiO_{4-b/2}$ where b is 1, 2 or 3. Especially useful polysiloxane blocks can contain, for example, chain terminating groups $R_3SiO_{0.5}$, main chain groups $—_{0.5}OSi(R_2)O_{0.5}—$ or chain branching groups $RSi(O_{0.5})_3$ or combinations of such groups having the same or different R substituents. It will be understood that the $O_{0.5}$ units indicate that the oxygen atom is shared with a neighbouring Si atom The polysiloxane block may be linear, cyclic or cross-linked, or it can have combinations of these structures. R may be any monovalent hydrocarbon radical of which examples include alkyl radicals such as methyl, ethyl, propyl, butyl, octyl and octadecyl, cycloalkyl radicals such as cyclohexyl, aryl radicals such as phenyl and tolyl an arylalkyl radicals such as benzyl and phenylethyl radicals. Polymethylsiloxane blocks are preferred as they can provide copolymers of highest water-solubiity. A minor proportion of Si-H groups may also be present. The polysiloxane block usually has an average molecular weight from 220 to 50,000; molecular weights of preferred blocks are 220 to 20000, more preferably 220 to 2000.

The polyoxyalkylene block used in the Si—C linked copolymer may be represented as

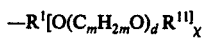
—$R^1[O(C_mH_{2m}O)_d R^{11}]_\chi$ in which the —$R^1$— linking group is attached directly to a silicon atom of the polysiloxane by one of its valencies, the other valencies ($\chi$ in number) being attached to $\chi$ number of polyoxyalkylene groups of the type —$O(C_mH_{2m}O)_d R^{11}$. Typical divalent —$R^1$— groups include 1,3-propylene-$(CH_2)_3$—, 1,11-undecylene-$(CH_2)_{11}$—,

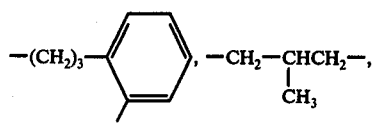

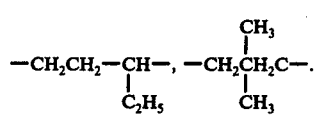

Divalent —$R^1$— groups containing C, H and O may also be used, for example —$CH_2$—$CH_2C(O)$—, —$(CH_2)_3C(O)$—, —$(CH_2)_3OCH_2C(O)$—, —$(CH_2)_3O(CH_2)_2C(O)$—, —$(CH_2)_{11}OCH_2C(O)$—,

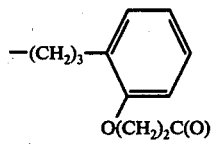

Typical divalent —$R^1$— groups containing C, H, O and N include —$(CH_2)_3NHC(O)$—,

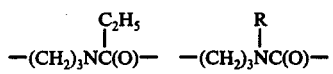

where R = alkyl, cycloalkyl or hydroxyl,

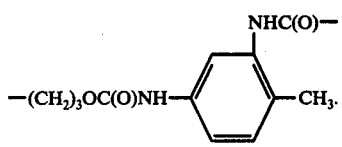

Trivalent —$R^1$= groups may be used, including

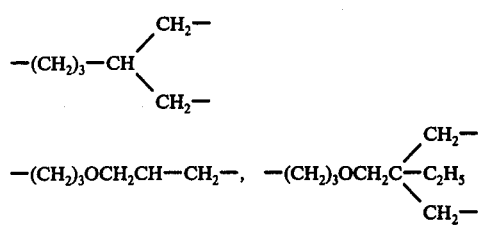

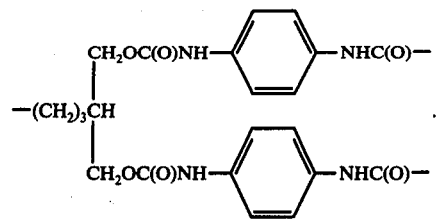

Amongst useful tetravalent —$R^1 \equiv$ groups are

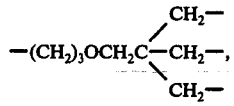

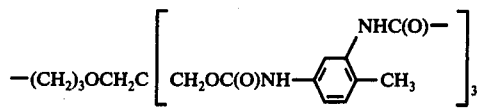

In the oxyalkylene group $(C_mH_{2m}O—)_dR^{11}$, "m" is preferably 2, 3 or 4; especially useful oxyalkylene groups are oxyethylene, oxy-1,2-propylene, oxy-1,3-propylene and oxy-1,4-butylene, the oxyethylene especially aiding water-solubility. The oxyalkylene groups may be the same or mixtures of oxyalkylene groups may be used. The value of "d" is preferably chosen so that the molecular weight of the $(—C_mH_{2m}O)_d—$ block falls within the range 120 to 9000, especially within the range 400 to 5000.

The terminal group $R^{11}$ of the polyoxyalkylene chains can be varied widely. Aliphatic and aromatic groups free from olefinic unsaturation are preferred, for example methyl, ethyl, isopropyl, n-butyl, i-butyl, undecenyl, 2-ethylhexyl, cycloalkyl groups including cyclohexyl, phenyl, tolyl or naphthyl. Other terminal groups $R^{11}$ which may be used include acetyl, propionyl, butyryl, carbonate or substituted carbamyl groups such as n-penyl-carbamyl $C_6H_5NHC(O)$ and n-ethyl carbamyl $C_2H_5NHC(O)$.

For copolymers having an Si-O-C linkage between the polymer blocks, $R^1$ in the polyoxyalkylene block is omitted. The polyoxyalkylene groups —$O(C_mH_{2m}O)_dR^{11}$ of the Si—O—C linked copolymers are as hereinbefore described.

The oxyethylene content of the polyoxyalkylene is of importance in controlling the water-solubility of the copolymer. Preferably the average C:O ratio in the oxyalkylene chain $(—C_mH_{2m}O)_d$ is below 3:1 to attain sufficient water solubility. We find that about 30% by weight oxyethylene units together with oxypropylene units is usually about the lower limit of oxyethylene which will impart adequate water solubility to an oxyethylene/oxypropylene polymer, or a copolymer of this with a siloxane; the C:O ratio in the oxyalkylene chain in such cases is about 2.6:1. More preferably, therefore, sufficient oxyethylene units should be present in the oxyalkylene block to provide a C:O ratio of at most 2.6:1. The ratio of siloxane to polyoxyalkylene in a methyl siloxane copolymer is preferably less than 2.5:1 for adequate water solubility.

Examples of water-soluble Si—C linked copolymers useful for the compositions of the invention are described in United Kingdom Patent Specifications Nos. 955,916; 1,015,611 and 1,133,273. Examples of suitable water-soluble Si-O-C linked copolymers are described in United Kingdom Patent Specification No. 954,041.

It is also preferred that the silicon compound be compatible with the other compounds of the liquid composition, especially in not precipitating a gel or a solid therefrom. Thus, silicon compounds which are strongly alkaline in water solution are less satisfactory than those which produce a neutral or acidic reaction in water.

The compositions are preferably used at a temperature such that the cloud point of the silicon compound is not exceeded in the liquid.

Other silicon compounds which may be used in the compositions include water-soluble alkoxy silanes, quaternary and other water-soluble nitrogen-containing silanes and siloxanes. Alkali metal siliconates are generally sufficiently water-soluble to be useful, for example $CH_3Si(OH)(ONa)_2$ or $CH_3Si(OH)_2(ONa)$. However, such compounds give strongly alkaline solutions and are less favoured for reasons described hereinafter.

Since the compositions are usually heated in order to form solid products, the silicon compound is decomposable to form silica. It is therefore preferred that the silicon compound should yield the maximum silica on decomposition, consistent with its other requirements. Suitably, silica yields may vary from 5% to 65% by weight of the silicon compound. Polysiloxanes solubilised by amine functional groups, for example $-(CH_2)_3-N(CH_3)_2$, can yield above 65%, for example 65% to 75%, by weight of silica.

Additional components such as pigments, polymers, colourants, surfactants, viscosity control additives or source of other oxides, may be included in the compositions, but since the purpose of the additional component is related generally to uses of the composition, these are described in more detail hereinafter.

The compositions may conveniently be prepared by dissolving the metal compound, the silicon compound and any other soluble components in water in any convenient order. For some embodiments it is necessary to provide some heat to assist dissolution. The compounds may be formed from suitable precursors, usually in the presence of the water solvent. For most uses of the compositions the concentrations of the major components, for example the metal compound, range from very dilute to saturation, e.g. in the range 10% to 80% by weight of composition. The concentration of dissolved organic silicon compound in the composition is preferably at least 0.1% by weight expressed as silicon dioxide.

The composition is prepared at any viscosity suitable for the use to which the composition is put. Viscosities of greater than 0.1 poise, for example from 0.1 poise to 5000 poise, are generally convenient for use as binders and for the formation of shaped bodies. Viscosity control additives, for example water-soluble polymers, are useful in producing the desired viscosity.

It is also possible to use a polymeric metal compound, for example basic aluminium or zirconium salts, to increase the viscosity of the compositions.

Especially in the case of compositions containing metal compounds which tend to gel in alkaline conditions it is preferred to maintain a neutral or acid reaction in the composition.

Especially for use of the compositions for making fibres as hereinafter described, a water-soluble silicon-free organic polymer is a much preferred additional component of the compositions.

The organic polymer is preferably a non-ionic water-soluble organic polymer, a polyhdroxylated organic polymer or a natural water-soluble gum. The organic polymer is preferably thermally stable under the conditions of fibrising, for example from ambient temperature to within several degrees of the boiling point of water. Examples of preferred organic polymers include:

partially hydrolysed polyvinyl acetate (polyvinyl alcohol),
polyacrylamide and partially hydrolysed polyacrylamide,
polyacrylic acids,
polyethylene oxides,
carboxyalkyl celluloses, for example carboxymethyl cellulose,
hydroxyalkyl celluloses, for example hydroxymethyl cellulose,
alkyl celluloses, for example methyl cellulose,
hydrolysed starches,
dextrans,
guar gum,
polyvinyl pyrrolidones,
polyethylene glycols,
alginic acids,
polyisobutylene derivatives,
polyurethanes, and
esters, copolymers or mixtures thereof.

Most preferred organic polymers are straight-chain polyhydroxylated organic polymers, for example polyvinyl alcohol, partially hydrolysed polyvinyl acetate, polyethylene oxide or polyethylene glycol.

Conveniently the molecular weight of the organic polymer is in the range $10^3$ to $10^7$, preferably as high a molecular weight as is consistent with the ability of the organic polymer to dissolve in the solvent used in the process of the invention. For example, it is preferred for the polyvinyl alcohol or partially hydrolysed polyvinyl acetate to have a medium or high molecular weight, the polyethylene oxide to have a molecular weight of $10^4$ to $10^6$ and the polymers derived from cellulose to have a molecular weight of 10000 to 50000.

It is preferred that the concentration of organic polymer in a composition used for forming fibres be from 0.1% to 10% by weight, more preferably from 0.1% to 2% by weight.

We prefer that little or no chemical reaction should occur between the metal compound and the organic polymer in the fibrising composition.

The especial property of the liquid compositions which makes them useful for many technical purposes is their ability to be converted to a solid composition in which the metal and silicon compounds remain as an intimate mixture. Many such mixtures are refractory and hard and suitable for many applications especially those requiring a resistance to high temperature. Decomposition or reaction of the metal and silicon compounds to their oxides is usually preceded by at least partial drying of the composition. Conversion to a solid is conveniently effected by heating, preferably at 200° to 1000° C.

Conversion of the liquid composition may be advantageously carried out, especially for compositions comprising aluminium compounds, by subjecting the dry or partially dry composition to hydrothermal treatment, that is, to the simultaneous action of heat and water vapour. Treatment with steam at 250° to 500° C is preferred.

In embodiments where a solid composition is produced from a liquid composition comprising a metal compound having an acid anion, for example aluminium oxychloride, it is especially advantageous to subject the solid to the action of a basic substance, for example ammonia or a volatile amine, before, or simultaneously with hydrothermal treatment.

The solid composition may be further heated to change the crystalline form of the oxide phases present or to sinter the composition, preferably at 1000° to 2000° C.

A composition according to the invention may be used to coat substrates, for example glasses, metals, metal oxides or ceramics by applying it to the substrate and subsequently converting it to form an insoluble coating. The substrate may take a variety of shapes, e.g. fibre, filament, film, granule or powder. Any convenient method, e.g. dip-coating, spraying, roller-or brush-coating, may be used to apply the coating to the substrate. The coating is dried, at least partly, and preferably heated, for example to a temperature from 200° to 1000° C to decompose the metal compound and the silicon compound.

The compositions may also be used as a binder or adhesive for a wide variety of materials, especially ceramic or refractory granules and fibres.

The compositions according to the invention are especially useful for the preparation of shaped bodies, for example cenospheres, films, porous structures and especially fibres, by forming the composition into the desired shape and converting the composition to a solid. Shaped bodies of thin section are preferred, as the release of volatile materials on decomposition or reaction of the composition is thereby facilitated, and is less likely to lead to cracking failure of the body.

Any convenient method for forming the composition into the desired shape may be employed; for cenospheres, spray-drying or prilling processes are suitable; for films, extrusion or casting techniques are convenient; for porous structures, a suitable foaming process or honeycomb formation technique may be used; for fibres, any convenient method of fibrising may be used, for example centrifugal spinning, drawing, blowing, tack-spining, extrusion through a spinneret or suitable combinations thereof. A relic process in which the composition is used to impregnate an organic fibre, may also be used. Fibrising by blowing is effected as hereinater described.

The viscosity of the composition used to form fibres is preferably one suited to the fibrising method employed. Conveniently the viscosity is in the range 0.1 to 3000 poise, preferably 100 to 1000 poise when fibrising is effected by extrusion of the composition through a spinneret to form a continuous filament. Fibrising of compositions of low viscosity, for example 0.1 to 100 poise, is preferably carried out by a blowing process as hereinafter described.

It is preferred to remove solvent from the formed body by evaporation, for example by heating at a temperature from 30° to 110° C, optionally under reduced pressure.

The shaped body may be further heated to a temperature greater than that of a drying treatment in order subsequently to complete decomposition of the metal or silicon compound, to change the crystalline form of metal oxide phases formed or to sinter the body. Thus the body may be heated at 1000° to 2000° C, preferably at 1000° to 1500° C, usually for a period from one minute to one hour. Heating may be carried out in stages, for example in successive steps of increasing temperature. Heating in the presence of air or oxygen may be desirable to oxidise any organic material present in the body.

Various additives may be included in the shapd body, singly or in combination, conveniently by adding them to the composition from which the shaped body is formed. Additives may also be included on the surface of the body by any suitable treatment process. Examples of additives which may be included are:
 (a) alkaline earth compounds, for example compounds of magnesium or calcium, decomposable to alkaline earth oxides;
 (b) acid oxides, especially $B_2O_3$, $P_2O_5$ or $ZrO_2$ or compounds which decompose to form acid oxides;
 (c) catalyst materials, for example Pt, Sb, Cu, Al, Psd, Ag, Ru, Bi, Zn, Ni, Co, Cr, Ti, Fe, V or Mn in elemental form or compound form;
 (d) fluorides, for example HF, NaF or $CaF_2$;
 (e) alkali metal compounds, for example compounds of lithium, sodium or potassium;
 (f) reinforcing particles or fillers such as colloidal silica;
 (g) colouring agents, for example mordant dyes or pigments;
 (h) rare earth oxides or yttria or precursors thereof.

The catalyst material may be present on the surface of the shaped body or it may be included within the body. In some embodiments, the catalyst material may be partly within the body and partly on its surface. One or more catalyst materials may be present.

When at least part of the catalyst material is included in the body, it is convenient to disperse or dissolve the catalyst material, or a precursor therefor, in the composition from which the shaped body is formed. By precursor is meant a material which when suitably treated, for example by heating or reduction, will generate a catalyst material, directly or indirectly. Shaped bodies, especially fibres comprising a catalyst material may be used in a wide variety of catalytic processes as hereinafter described.

The preferred shaped body is a fibre, conveniently made by fibrising the liquid composition followed by decomposition. Fibrising by extrusion through a spinneret is especially useful in producing continuous fibre. Fibrising is most conveniently carried out at the ambient temperature, but if desired it may be carried out at any other temperature at which the fibrising composition is stable. For example, it may be convenient in some embodiments to vary the temperature in order to produce the viscosity of the composition appropriate for fibrising.

Fibrising by blowing comprises extruding the fibrising composition through one or more apertures into at least one gas stream having a component of high velocity in the direction of travel of the extruded composition. The extruded composition is drawn down by the action of the gas stream on it. The dimensions of the aperture through which the fibrising composition is extruded may vary widely. We prefer to use an aperture having at least one dimension larger then 50 microns and smaller than 500 microns. The aperture may have a variety of shapes, for example we have used circular, triangular and star-shaped apertures. It is convenient in some embodiments to extrude the fibrising composition through a slit, which may be substantially straight or curved, for example in the case of an annular slit. A plurality of apertures may be used in one extrusion head. The material in which the aperture is formed may be chosen from a wide variety of substances. A metal, for example stainless steel or monel, is especially useful. Owing to the fact that the fibrising composition may be at or near ambient temperature during extrusion and that two low extrusion pressures are used, it is convenient, especially from the point of view of cheapness, to use a plastics material in which to form the aperture; suitable plastics materials includes polystyrene, polypropylene, polyvinyl chloride and polytetrafluoroethylene.

It is preferred to use two gas streams which converge at or near the point where the fibrising composition is extrude from the aperture; preferably the angle between the converging gas streams is from 30° to 60°. In preferred embodiments, gas streams emerge from slots on each side of a row of apertures or a slit; or a conically-shaped gas stream emerges from an annular slot arranged substantially concentrically around an annular extrusion slit. The velocity of the gas stream may be varied over a wide range; we prefer to use velocities in the region of 40 to 1500 ft per second. Air is the preferred gas, most conveniently air at ambient temperature.

Control of the rate of water removal from the extruded composition may be effected by the degree of saturation of the gas stream. Conveniently the gas may be mixed with water vapour in the gas reservoir, but as expansion of the gas from its reservoir may tend to alter the degree of saturation, it is sometimes useful to add water-vapour after expansion. Air at a relative humidity of greater than 80% is espcially useful.

The distance separating the point of emergence of the gas stream from the extrusion aperture should be as small as possible; we prefer that the distance between the closest edges of th aperture and the air slot be less than 0.25 mm.

The pressure employed to extrude the fibrising composition will depend on the viscosity of the composition, the size and shape of the aperture and the desired rate of extrusion. We find that pressures from 16 to 120 lb per square inch absolute are convenient for compositions having viscosities up to about 100 poise.

The fibre may be dried further after attenuation in the gas stream if required. The fibre may then be subjected to hydrothermal and/or ammonia treatment as hereinbefore described, if desired. The fibre may also optionally be subjected to further processing which may be required, for example it may be heated to complete the decomposition of the metal compound to the oxide and to decompose the organic materials in the fibrising composition, to change the crystalline form of oxide phases present or to sinter the fibre. Typically, the fibre may be heated at a temperature from 500° to 1200° C for a period of from one minute to one hour, preferably 500° to 800° C for one minute to one hour.

Various additives as hereinbefore described may be included in or on the surface of the fibre, singly or in any combination, conveniently by adding them to the fibrising composition or by including them on the surface of the fibre by any suitable treatment process.

Thus the fibres may be coated with a size, such as polyvinyl alcohol or stearic acid. They may be immersed in a solution of ethyl silicate, washed and heated to give a fibre containing extra silica. They may also be soaked in solutions of metal compounds, for example magnesium ethoxide in methanol, and the treated fibres heated to give a fibre containing additional refractory metal oxide. The fibres may be given a silicone treatment, for example by applying a chlorosilane (in vapour or solution form) to the fibre surface.

Especially conveniently a catalyst material may be dispersed in the fibrising composition by dissolving it, or its precursor, in the said composition. In preferred embodiments of the invention water-soluble materials, for example salts of catalytic metals, espcially metal nitrates, are dissolved in the aqueous fibrising compositions.

Dispersion of the catalyst material in the fibrising composition may also conveniently be carried out by mixing insoluble or partly soluble particlulate catalyst material with the fibrising composition. Preferably the mean size of particles thus dispersed should be smaller than the mean diameter of the fibre produced, and more particularly particles should be of colloidal size.

Any desired quantity of catalyst material may be dispersed in the fibrising composition provided that the fibre formed is still sufficiently strong and coherent for use as a fibrous catalyst. We fing that up to about 10% of a catalyst material may be incorporated in the fibre without serious deterioration in fibre properties.

It is peferred that the catalyst material be chemically compatible with the constituents of the fibrising composition. When the fibre is heated as herein dexcribed, it is preferable for the catalyst material to be stable at the temperature of heating. In the case of a catalyst material precursor, it is frequently convenient for the catalyst to be formed from the said precursor during heating of the fibre.

The catalyst material may be incorporated into the fibre by soaking the said fibre in a solution of the catalyst material or a catalyst material precursor in a suitable solvent and subsequently removing the said solvent from the fibre. Water is a suitable solvent for many catalyst materials or their precurs, for example metal salts. A fibre may be soaked before or after it is heated to form a fibre of different composition as herein described.

The catalyst material may conveniently be deposited in a suitable form on at least part of the fibre surface. For this purpose it may, if desired, be bonded to the said surface by means of a binding agent, which may itself be a catalyst material, for example aluminium phosphate. Bonding may also be effected by means of an application of a composition according to the invention of the said surface or to the catalyst material or both, and removal of the solvent of said composition.

In embodiments in which no binder is used to assist adherence of the catalyst material to the fibre surface, it is often possible to bring about some chemical interaction between the catalyst and the fibre to improve bonding. In most embodiments of the invention, however, it is satisfactory merely to deposit the catalyst material on the fibre surface in a form sufficiently fine that the normal forces of physical attraction take effect. Thus it is convenient to deposit the catalyst material from a mist or vapour comprising the catalyst material or its precursor. Most conveniently the catalyst material or its precursor is deposited on the fibre surface by treating the said surface with a dispersion comprising the catalyst material or its precursor and a suitable liquid. A solution of the catalyst material or its precursor in a volatile solvent is espcially useful. In cases where the catalyst material is dispersed in a liquid which does not dissolve it, it is preferred that the catalyst material be in a finelydivided form, most preferably having a mean size less than 0.5 micron.

The fibre comprising a catalyst material may be further treated, for example to bring about desired changes in the catalyst material. For example, in cases where a catalyst material precursor has been incorporated in or on the fibre, it will be necessary to generate the active catalyst material by a suitable process. The processes normally used include chemical reaction to form a different compound, reduction and heating. Some of these processes, especially heating, may be combined with hydrothermal treatment or heating the fibre to decompose the metal compound or the organic material of the fibrising composition. Treatment of the fibre to achieve desirable physical changes in the catalyst material may also be carried out; for example, changes in the surface area or crystal structure may be desirable to achieve specific catalytic effects. Treatment of the fibre to eliminate undesirable substances, for example catalyst poisons, may be useful in some embodiments.

The compositions of the invention are espcially useful for the preparation of coatings, binders and shaped bodies, especially fibres, comprising zirconia or alumina and silica. Thus compositions comprising an aluminium compound decomposable to alumina, especially aluminium oxychloride, basic aluminium acetate or basic aluminium formate, and a water-soluble organic silicon compound as herein described may be decomposed by heating to form solid compositions comprising alumina and silica in which the alumina is substantially in one or more of its transitional phase forms at temperatures up to 1400° C.

Alumina is transformed from its transitional phase forms (eta, gamma, delta and theta) to its alpha form on heating at 1200° C for a short time ("Alumina as a Ceramic Material" Edited by W. H. Gitzen, The American Ceramic Society, 1970).

While not wishing to be restricted to any particular theory, we believe that it is likely that the addition of silica to the alumina by the use of a water-soluble silicon compound in the composition of the invention gives a homogeneous dispersion of the silica in the alumina and thereby produces a very considerable reduction of the rate of transformation of low temperature phases to high temperature phases and in particular of transitional aluminas to alpha-alumina on heating. Thus shaped bodies comprising alumina prepared according to the invention will exhibit improved thermal stability.

The invention thus provides a solid composition, for example a fibre, comprising alumina and silica wherein the ratio by weight of alumina to silica is from 85:15 to 98:2 in which the crystalline alumina is substantially in one or more of its transitional forms when the composition is heated at 1200° C for at least one hour, preferably for at least 10 hours. In such compositions the crystalline alumina is therefore substantially free from the alpha phase.

The invention also provides solid compositions comprising alumina and silica which, when heated to 1400° C for one minute, two minutes or five minutes are substantially free from alpha-alumina and the mullite phase of aluminosilicate.

The invention further provides solid compositions comprising alumina and silica which, when heated to 1300° C for 5 minutes, 30 minutes or 2 hours, are substantially free from alpha-alumina and the mullite phase of aluminosilicate.

The invention further provides solid compositions comprising alumina and silica which, when heated to 1200° C for 10 minutes or one 100 hours, are substantially free from alpha-alumina and the mullite phase of aluminosilicate.

The invention further provides solid compositions comprising alumina and silica which, when heated to 1100° C for 1 hour, 10 hours or 100 hours, is substantially free from alpha-alumina and the mullite phase of aluminosilicate.

Solid compositions comprising alumina and silica when heated to the temperatures and for the times described are substantially in one or more of the transitional alumina forms.

Thus solid compositions comprising alumina and silica wherein the ratio by weight of alumina to silicon is from 85:15 to 98:2 may be obtained in which the crystalline alumina is substantially in the delta or theta phase when the composition is heated at 1200° C for at least 1 hour, preferably for 10 hours.

Further, such solid compositions, apart from those in which theta is the major phase, when heated to the temperatures and for the times described, show no X-ray crystallographic evidence for the existence of crystalline silica or aluminosilicate (mullite).

The introduction of silica into fibres comprising metal oxides by the processes of the invention have the further advantage that the homogeneity of the fibrising composition avoids the problems associated with the use of particulate silica, for example as colloidal particles. Such problems include (1) the need to limit fibre diameter due to interference to required flow characteristics for fibrising by the presence of particles; (2) the necessity to avoid otherwise desirable polymeric organic fibrising aids which tend to flocculate sols: and (3) the presence in the finished fibre of regions of high silica content which are liable to crystallise to a silicate phase.

The invention thus provides a fibre comprising silica and alumina and/or other metal oxide, especially zirconia, preferably wherein the ratio by weight of metal oxide and silica is 85:15 to 98:2, preferably from 90:10 to 98:3, which may be in continuous or discontinuous lengths, although discontinuous fibres may have very high ratios of length to diameter, for example greater than 5000. Fibres can be made with average diameters less than 20 microns, typically from 0.5 to 5.0 microns. As a result of the avoidance of formation of undesirable crystal forms of alumina as hereinbefore referred to, alumina fibres show remarkable resistance to physical change at high temperature, for example from 1000° to 1400° C. In general, the fibres heated at 500° to 800° C have a very high surface area, a BET surface area of more than 50 m$^2$/g being consistently observed, and figures of 50 m$^2$/g to 200 m$^2$/g being the usual measured range after hydrothermal treatment and after 1 hour of heating at 500° to 800° C. The presence of silica introduced by the processes of the invention increases the thermal and hydrothermal stability with respect to surface area of an alumina fibre, and hence certain catalytic properties. The acidity of the alumina conferred by the silica content provides improved ion exchange properties of the solid composition. The fibres may be collected as individual fibres or they may be collected in the form of a yarn, mat or felt. Mats or felts are conveniently formed by collecting the fibres on a moving band, preferably a band of foraminous material, for example steel mesh. The fibres may be collected on a mould to provide a shaped felt. If desired the fibres may be bonded together, for example by collecting the fibres before they are dry and heating the resultant mat or felt. Bonding may also be effected by the use of a binding agent. The mat or felt may be compressed, if desired, for example to increase its density. The invention is especially useful in preparing glassy fibres. Fibres spun into yarn may be made up as cloth.

Fibrous catalysts according to the invention comprising the metals copper, ruthenium, nickel, palladium, platinum or silver, compounds or combinations thereof, are especially useful in processes such as the following:
  dehydration of alcohols,
  methanol synthesis,
  reduction of nitrobenzene,
  ammonia decomposition,
  steam reforming of naphtha or natural gas,
  hydrogenation of olefins, aromatics, nitrides, fats and oils,
  sulphur dioxide oxidation,
  hydroalkylation,
  methane ammoxidation,
  ethylene oxide from ethylene,
  formaldehyde from methanol.

Semiconductor oxides are useful catalyst materials. For example, $Cr_2O_3$/"eta" alumina may be used for paraffin dehydrogenation or naphtha reforming.

Metallic halides, for example $CuCl_2$, $SbCl_3$, $AlCl_3$ or $CrCl_3$, provide fibrous catalysts which are useful for a variety of chlorination and oxychlorination reactions or isomerisation of paraffins, olefins and aromatics.

Organo-metalic catalysts may be best employed in the invention by soaking or coating of the preformed fibre. The fibrous catalysts are useful in producing ethylene oligomers, polyethylenes and polyesters. Metal carbonyls, for example $HCo(CO)_4$, provide fibrous catalysts suitable for carrying out OXO processes.

The fibrous catalysts, especially those containing platinum, palladium, molybdenum, $Co_3O_4$, $V_2O_5$, $Cr_2O_3$, $MnO_2$, $Fe_2O_3$ or NiO, or combinations thereof, may be used in a car exhaust treatment device, for example to catalyse the oxidation of car exhaust gases, for example in an afterburner.

Other catalytic materials found useful include:
  cobalt molybdate,
  nickel molybdate,
  bismuth molybdate,
  copper molybdate,
  zinc chromite,
  cobalt oxide, $Co_3O_4$.

Fibrous catalysts according to the invention are advantageous owing to their high external surface areas; they are heat-resistant and mechanically strong.

The invention is thus useful in producing shaped bodies comprising metal oxides, especially fibres and more especially alumina fibres which may be of very small diameter, dense, white, strong and of high modulus for example $20 \times 10^6$ to $35 \times 10^6$ pounds per square inch Young's modulus in the case of alumina fibres. The bodies, especially the fibres, may conventiently be used, for example as high temperature insulating materials, fillers, as reinforcement for resins, metals and ceramic materials, inert filters, catalysts or catalyst supports.

The invention is illustrated, but not limited, by the following Examples. All X-ray diffraction results quoted in the Examples were obtained using a Philips diffractometer, incident Copper radiation and a grahite monochromator in the diffracted beam to select the K α wavelength. Apparent crystallite sizes of eta alumina were derived from the measured full width at half height of the diffraction maxima at 67° 2 θ after instrumental broadening had been removed by fourier deconvolution, (an apparent crystallite size of 60 A is derived from a peak at 67° 2 θ having a deconvoluted full width at half height of 1.76° 2 θ). Phase identification is based on the results of J. W. Newsome, H. W. Heiser, A. S. Russell, H. C. Stumf, Technical Paper No. 10, second revision, Alumina Properties, Aluminium Company of America, Pittsburg, Pennsylvania, 1960.

In the following Examples reference is made to various silicon compounds. Details of these are shown in the following tables, with the corresponding reference used in the Examples.

| Ref. | Structure | Approx MW | Silicone to polyether ratio w/w |
|---|---|---|---|
| A | $Me_3Si(OSiMe_2)_{36}(OSiMe)_{12}OSiMe_3$<br>                $\|$<br>     $(CH_2)_3NHCO{-}(OC_2H_4)_{12}OMe$ | 12,000 | 1:2.3 |
| B | $Me_3Si(OSiMe_2)_{5.5}(OSiMe)_{2.5}OSiMe_3$<br>                $\|$<br>     $(CH_2)_3NHCO(OC_2H_4)_{12}OMe$ | 2,400 | 1:2.3 |
| C | $Me_3Si(OSiMe_2)_{5.5}(OSiMe)_{2.5}OSiMe_3$<br>                $\|$<br>     $(CH_2)_3NHCO(OC_2H_4)_{12}(OC_3H_6)_2OMe$ | 2,500 | 1:2.3 |
| D* | $Me_3Si(OSiMe_2)_{43}(OSiMe)_5OSiMe_3$<br>                $\|$<br>     $(CH_2)_3NHCO(OC_2H_4)_{17}(OC_3H_6)_{13}OC_6H_{11}$ | 12,000 | 1:2.3 |
| E | $Me_3Si(OSiMe_2)_{33}(OSiMe)_3OSiMe_3$<br>                $\|$<br>     $(CH_2)_3NHCO{-}(OC_2H_4)_{12}OMe$ | 4,700 | 1:0.7 |
| F | $Me_3SiO(SiMe_2O)_{5.6}(SiMeHO)_{0.2}(SiMeO)_{2.16}SiMe_3$<br>                $\|$<br>     $(CH_2)_3NMe_2$ | 900 | — |

*diluted with 100:7 of $C_4H_9(OC_2H_4)_{17}(OC_3H_6)_{13}$ . OH

Table 2

| Reference | Spurce | Approx MW | Silicone to Polyether ratio |
|---|---|---|---|
| DC192 | Dow-Corning Corporation | 25,000 | 1:2.6 |
| DC193 | Dow-Corning Corporation | 2,100 | 1:1.7 |

Table 2-continued

| Reference | Spurce | Approx MW | Silicone to Polyether ratio |
|---|---|---|---|
| L546 | Union Carbide Corporation | 15,000 | 1:2.6 |
| L5340 | Union Carbide Corporation | 14,000 | 1:1.5 |

EXAMPLE 1

Fibres were prepared from a solution of the following composition.
  200g Aluminium chlorohydrate. (Al:Cl ratio 2:1 23.8% w/w $Al_2O_3$)
  94.4g Polyvinyl pyrrolidone solution (3% w/w of k-90 grade to give 6% w/w $Al_2O_3$)
  9.3g Polysiloxane copolymer A (Table I)

The solution was evaporated under partial vacuum at 35°–40° C until the viscosity at ambient temperature was 15 poise. The solution was extruded through small holes 240 microns diameter) and attenuated with air to give dry unfired fibres with a mean diameter of 4 microns.

The fibres were further dried at 100° C, heated in steam at 350° C for 15 minutes and fired at 900° C for 15 minutes to give a strong white flexible product.

Chemical analysis showed that the fibre contained 5% $SiO_2$ (w/w $Al_2O_3$). Electron microscope examination showed no evidence of oxide phases other than the transition alumina phases.

Samples of fibres were heated to the temperature given below. Surface area measurement by the nitrogen BET method gave the following results:

| Temp. ° C | Time (hr) | SA m²/g |
|---|---|---|
| 1100 | 1 | 61 |
| 1200 | ½ | 40 |

X-ray phase analysis showed that fibres heated for 65 hours at 1200° C were in the gamma and delta alumina phases, with only a trace of the alpha phase detected. Fibres heated for 1 hour at 1350° C were in a mixture of the gamma, delta and theta phases, with no trace of alpha alumina.

EXAMPLE 2

Fibres were prepared as in Example 1, but with only 4.6g of the polysiloxane copolymer A to give 2% $SiO_2$ w/w $Al_2O_3$. Fibres fired as described in Example 1 up to 900° C and then fired for 1 hour at 1200° C maintained flexibility and strength. X-ray analysis showed only the gamma and delta phases.

EXAMPLE 3

Fibres prepared as in Example 1, but containing 5% $SiO_2$ w/w $Al_2O_3$ from the polysiloxane copolymer B instead of A were fired as in Example 1 to 900° C. Nitrogen absorption measurements gave a surface area of 74 m²/g and a pore volume of 0.083 cm³/g. The only phase present on heating to 1000° C for 2 hours was eta alumina. After heating to 1100° C for 16 hours the major phase present was gamma alumina with a trace of delta alumina.

No evidence was obtained for an aluminosilicate or silica phase.

EXAMPLE 4

Solutions were prepared as in Example 1 using the commercially available water-soluble polysiloxane copolymers DC 192, DC 193, L 546 and L 5340 listed in Table II. Appropriate quantities were added to give 2% silica in the final alumina fibres which were spun and heat-treated as in Example 1 up to 900° C. After calcination at 900° C the fibres were strong and flexible, with no evidence of a mullite or alpha alumina phase by X-ray investigation. X-ray analysis on fibres heated to 1050° C for 1 hour gave only transition alumina phases.

EXAMPLE 5

Fibres were prepared as in Example 1 using the polysiloxane copolymer C to give the following combinations of compositions, - all percentage weights expressed on the $Al_2O_3$ content of the fibres or solutions:
  5.1; 5% $SiO_2$ 6% Polyvinyl pyrrolidone
  5.2; 5% $SiO_2$ 6% Polyvinyl alcohol — high molecular weight water-soluble grade
  5.3; 1% $SiO_2$ 6% Polyvinyl pyrrolidone (PVP)
  5.4; 7.5% $SiO_2$ 6% PVP After heat treatment as in Example 1 to 900° C all fibres were strong and flexible.

EXAMPLE 6

A sample of the fibres prepared in Example 3 and heated to 900° C were sandwiched between 'Incoloy' alloy DS metal gauzes and tested for 50 hours in a car exhaust stream on an engine test bed at temperatures up to 750° C. At the end of the test the total time at 750° C was 20 hours, with the majority of the remainder at 500° C. Inspection of the fibrous pad after this treatment showed that the fibre had not suffered significant damage or weight loss. X-ray analysis after treatment showed the only phase present was eta alumina with a crystallite size less than 80 A. The surface area after treatment had increased to 110 m²/g.

EXAMPLE 7

Fibres were prepared as in Example 1 but with a 5% nickel content, added to the solution as $NiCl_2.6H_2O$. On firing as in Example 1 to 900° C strong fibres were produced.

EXAMPLE 8

Fibres were prepared as in Example 1 with 5% MgO content, added as $MgCl_2.6H_2O$ to the spinning solution. On firing to 900° C as in Example 1 strong white fibres were produced. When heated in a hot-stage X-ray apparatus, the fibres showed the presence of alpha alumina at 1140° C.

EXAMPLE 9

Fibres were prepared to give a 1:1 w/w ratio of $ZrO_2:Al_2O_3$ with 7% w/w based on $ZrO_2$ of rare earth oxides (60% yttria grade) as a zirconia phase stabiliser and containing 5% w/w of silica. The spinning solution was prepared from the following components:
  Aluminium oxychloride solution (23.5% $Al_2O_3$ w/w, Al:Cl, 2:1)
  Zirconyl acetate solution. (Commercial 22% w/w $ZrO_2$ grade)
  Rare earth chlorides solution (60% yttria grade)
  Polyethylene oxide (3000,000 MW)
  Polysiloxane copolymer B The solution was evaporated, spun into fibres and fired as in Example 1. After 1 hour at 1200° C the fibres were strong and flexible. In comparison fibres prepared from a similar solution without the siloxane additive were weak and friable when fired to 1200° C.

EXAMPLE 10

Fibres were prepared as in Example 1 but using the siloxane copolymer D to give 5% $SiO_2$. The solution prior to spinning was cloudy and the unfired fibres produced by extrusion followed by attenuation with an air stream were of variable geometric quality. The fibres were heated in steam at 350° C. for 15 minutes, followed by calcination at 1200° C for 1 hour to give white flexible fibres. X-ray analysis showed the fibres contained eta, gamma and delta alumina with a minor amount of alpha alumina. The presence of alpha alumina is thought to be due to phase separation (cloudiness) resulting in a lower effective $SiO_2$ content in some parts of the fired fibre.

EXAMPLE 11

A spinning solution was prepared from the following components:
  200g Aluminium chlorohydrate (23.8% $Al_1O_3$ by weight Al:Cl. 2:1)
  2.85g Polyvinyl alcohol (high molecular weight water-soluble grade)
  140g Water
  9.4g Polysiloxane copolymer C The solution was evaporated to a viscosity of 15 poise measured at ambient temperature and spun into fibres with a mean diameter of four microns. The fibres were dried at 100° C, heated in steam at 350° C for 15 minutes and calcined at 900° C for 15 minutes. A sample of these fibres was heated to 1200° C on a hot-stage X-ray diffractometer at a rate of 30° C/hour. Phases present at 800° C were chi and eta alumina; the gamma phase appeared at 1020° C and reached a maximum at 1110° C; the delta phase appeared at 1060° C and reached a maximum at 1140° C, while the eta phase had faded by 1150° C. There was no evidence for mullite or alpha alumina at 1200° C, or on re-cooling to room temperature.

EXAMPLE 12

A solution suitable for use as a binder or coating material was prepared by co-dissolving the following components;
  400g Aluminium chlorohydrate solution (2:1 Al:Cl ratio, 23.5% w/w $Al_2O_3$)
  1g Glacial acetic acid
  10g Polyvinyl pyrrolidone (K 60 grade)
  24g Siloxane copolymer A (23.5% w/w $SiO_2$)
  200g of a graded tabular alumina grog were well-mixed with 20g of the above solution and pressed into a glass dish. The contents of the dish were subjected to ultrasonic vibration for 30 minutes, and allowed to set for 20 hours in a drying oven at 80° C. The tablet so formed was removed from the dish and heated to 400° C over a 2 hour period, and subsequently to 900° C over a further 2 hours. The tablet was then transferred directly into a furnace at 1400° C and heated at that temperature for 1 hour. After the tablet was removed from the furnace and allowed to cool to room temperature, it was examined and found to be tough and free from surface cracks.

EXAMPLE 13

A 1-inch cube of ceramic honeycomb, suitable for use as a car-exhaust ceramic matrix component, was coated with high-surface area alumina using the solution prepared as described in Example 12. The untreated cube had a specific BET surface area of 0.4 $m^2/g$, an estimated flat geometric area of 200 $cm^2$, and a weight of 13g. This cube was soaked in the solution described above while suspended on a fine wire, and then slowly withdrawn from the solution over a period of 5 minutes. The cube was placed on a filter paper pad to allow residual solution to drain off, and was dried at 80° C for 10 minutes. The cube was subsequently heated in air at 350° C for 10 minutes and fired at 900° C for 15 minutes. On cooling the weight increase was found to be 0.6g and the BET surface of the cube was 4.8 $m^2/g$.

EXAMPLE 14

To 80g of the solution prepared as described in Example 12 was added 1g of chloroplatinic salt (0.4g Pt). A ceramic honeycomb cube as used in Example 13 was coated in this solution, drained, dried and fired to 900° C as described in Example 13. The increase in weight of the cube was found to be 0.8g, and the BET surface of the cube was now found to be 4.3 $m^2/g$.

EXAMPLE 15

The silicone-polyoxyethylene compound E having a calculated silica equivalent of 46.5% was found to give a cloudy mixture when added to an aluminium oxychloride solution at a viscosity of 10 poise, which settled out to give two distinct layers of solution. Accordingly compound E was mixed at a 50:50 volume ratio with industrial methylated spirits, and this solution was carefully mixed with a 20 poise solution containing 1% w/w polyethylene oxide (molecular weight 300,000) and 28% w/w $Al_2O_3$ as basic aluminium oxychloride, to give a clear bubble-free mixture. This mixture was extruded through small holes into co-current streams of high-velocity humidified convergent air jets and collected on a wire guaze as fibre having a mean diameter of 6 microns.

EXAMPLE 16

An amine-functional polysiloxane copolymer F contained a 'silica equivalent' of 66.3%.

1.79g of this compound were mixed with an equal volume of industrial methylated spirits and then titrated with N/10 hydrochloric acid to give a pH reading of 4.0. This solution was then mixed with 36.7g polyethylene oxide solution (2% w/w of molecular weight 300,000) and 100g of 23.8% w/w $Al_2O_3$ equivalent aluminium oxychloride solution. The final mixture was evaporated down to a viscosity of 20 poise in a vacuum evaporator and blow-spun into fibres having diameters in the range 2-3 microns.

EXAMPLE 17

4.76g of t-butoxy silatrane were dissolved in water and filtered to remove a trace of insoluble material. The pH of the solution was adjusted to 4.0 with dilute hydrochloric acid and the solution was mixed with 100g of 5/6 basic aluminium oxychloride solution (23.5g $Al_2O_3$) and 36.7g of a 2% aqueous solution of 300,000 molecular weight polyethylene oxide. The mixture was evaporated to a viscosity of 30 poise on a vacuum rotary evaporator to give a clear yellowish solution. A sample was allowed to thicken by evaporation in a glass dish and fibres were pulled from the sample at the end of a spatula. On standing for 20 hours a sample was found to have set to a gelatinous material. The fibres obtained were treated with ammonia, heated in steam at 350° C and fired at 900° C for 15 minutes followed by 1200° C for 1 hour.

EXAMPLE 18

Alumina fibres containing silica and boric acid were prepared from the following composition:
200g Aluminium chlorohydrate (Albright & Wilson, 23.5% $Al_2O_3$, 2:1 Al:Cl ratio)
2g Boric acid
5.6g Polysiloxane copolymer A
143g Polyethylene oxide (1% w/w 300,000 molecular weight)

The solution was evaporated to a viscosity of 20 poise and blow-spun into fibres having a mean diameter of 4 microns. The fibres were treated with 0.2% v/v ammonia in air at ambient temperature, heated in steam at 350° C for ¼ hour and fired at 900° C for ¼ hour, and finally at 1300° C for 1 hour. Phase analysis by X-ray diffraction showed that the major phase was delta alumina with a minor theta alumina phase and a smaller amount of an unidentified phase. No trace of alpha alumina or mullite was detected. A further sample of the fibre fired to 900° C was reheated at 1400° C for 1 hour and found to contain a major theta aluminium phase and a minor alpha alumina phase: again mullite was not detected.

EXAMPLE 19

Fibres were prepared from the following formulations:
200g aluminium oxychloride (23.5% w/w $Al_2O_3$. Albright & Wilson)
138g Polyvinyl alcohol solution, 2% w/w 'Elvanol' 50–42 in water
9.2g Polysiloxane copolymer A The solution was evaporated to a viscosity of 100 poise and allowed to stand for 20 hours. The solution was then extruded from a bomb through a microfilter and out of a 100 micron spinerette hole. Fibres were drawn down and wound up on a rotating drum covered in polythene film. The fibres were removed from the drum, dried at 100° C, heated in steam containing 5% v/v ammonia at 350° C for ½ hour and fired at 1000° C for ¼ hour. Samples of this fibre were fired at 1200°, 1300° and 1400° C for ½-hour periods. Selected fibres, with diameters approximately 10 microns were mounted on the head of a radio loud speaker using sealing wax. The modulus of the fibres was measured using the vibrating read technique for lengths in the range 0.2 to 0.4 cm. The loud speaker was fed from a decade oscillator and the resonant frequency of the fibres was measured by observing the vibration at resonance frequency using a travelling microscope. A graph was plotted for each fibre of the fundamental resonance frequency fr against $D/l^2$, where D = diameter and l = length are found to be a straight line passing through the origin within expected error. The specific modulus of the fibre (E/$\rho$) was then calculated from the slope M using the formula E/$\rho$ = 0.074 $M^2$psi, where $\rho$ = fibre density.

The results for the relative specific modulus are given below, compared with that of E-glass fibre (E/$\rho$ = 1)

| Firing Temperature (½ hr) ° C | 1000 | 1200 | 1300 | 1400 |
|---|---|---|---|---|
| Relative Specific Modulus (E/$\rho$) | 1 | 1.3 | 1.5 | 2.3 |

For comparison, similar fibres made from a formulation not containing the copolymer and fired at 900° C gave an E/$\rho$ value of 1.5, but on firing at 1000° C this dropped to 1 and at high temperatures the fibres were too brittle for measurements to be obtained.

EXAMPLE 20

Fibres were prepared from the following components:
200g Aluminium chlorohydrate (23.8% w/w $Al_2O_3$, 2:1 Al:Cl ratio)
142.8g Polyethylene oxide solution (1% w/w 300,000 MW)
18.8g Polysiloxane copolymer A The solution was evaporated to a viscosity of 15 poise and blow-spun into fibres having a mean diameter of 3 microns. The fibres were collected and treated with 0.2% v/v ammonia gas in air, heated in steam at 350° C for ¼ hour and fired at 900° C for ¼ hour. Chemical analysis indicated that the fibres contained a ratio of $SiO_2$:$Al_2O_3$ of 9:100.

A sample of fibre was heated for 1 hour at 1200° C. X-ray analysis indicated that the fibres contained a major delta alumina phase and a minor gamma phase. No alpha alumina or mullite was detected.

A further sample was fired at 1300° C for 1 hour. This sample gave major phases of mullite and theta alumina. On firing a further sample to 1400° C for 1 hour major phases of mullite and theta alumina were present, with a trace of alpha alumina detected.

EXAMPLE 21

Fibres were prepared as in Example 20, but with only 4.7g of the copolymer A. These fibres on heating for 1 hour at 1200° C gave major gamma and delta phases with eta alumina also present. On firing for 1 hour at 1300° C major alpha and theta phases of alumina were observed. After 1 hour at 1400° C a major alpha alumina phase and the mullite phase of alumino silicate was observed.

In comparison, a similar fibre of eta alumina containing no silica gave a major alpha alumina phase after 1 hour at 1200° C. However a major delta phase could be obtained by heating the pure alumina fibre when in its eta phase in an atmosphere free from chloride for 2 hours at 1050° C. Heating the pure alumina fibre at 1200° C for a further ½ hour gave alpha alumina.

EXAMPLE 22

Fibres were produced as in Example 20, but with the requisite amount of copolymer A to give 5% silica w/w total oxides in the final fired fibre. The fibre was fired for periods of 1–20 hours at 1000° C. Phase analysis showed that after 20 hours the phase was eta alumina with an apparent crystallite size of 60 A. A sample of fibre was set in epoxy resin and ion-beam thinned with argon ions to give a specimen suitable for transmission election microscope (TEM) studies. Examination of the microstructure by TEM with modifications of up to 200,000 showed an even granular structure. No evidence was obtained for the presence of more than one crystalline phase, nor was there any evidence for a non-homogeneous dispersion of silica or silicate particles.

A sample of fibres fired for 20 hours at 1200° C gave a major delta alumina phase by X-ray analysis. An ion-beam thinned sample showed a granular microstructure similar in form to that previously described, although dark-field images showed larger crystalline regions of the order of 500 A in size.

Further X-ray studies on the samples indicated the degree of crystallinity of the delta alumina was greater than 25% by weight, and the intensity of background scattering was consistent with an amorphous component in the order of 25% by weight.

EXAMPLE 23

Fibres were produced as in Example 20, but with sufficient silica content from the copolymer A to give 7% by weight of $SiO_2:Al_2O_3$. After the 900° C firing stage, these fibres were refired for 3 minutes at 1500° C in a tube furnace. Transmission electra microscopy on an ion beam thinned sample at a magnification of × 100,000 single crystal platelets apparently set in a glassy matrix. Examination of a sample of this fibre of X-ray analysis showed that the fibre contained a major theta alumina phase and a minor mullite phase. Stereoscan micrographs (Cambridge Stereoscan S2A) of these fibres at a magnification of 10,000 showed an apparently smooth fibre surface.

A further sample of these fibres heated to 1600° C for 5 minutes had converted to a major alpha alumina phase with a minor mullite phase. Transmission election microscopy showed anisometric single crystals of alpha alumina with one dimension of ~2000 A and a second dimension of up to 2 microns.

A furthe sample in the form of a fibre blanket was heated at 1400° C for 20 hours. These fibres had developed a surface roughness when observed with the Stereoscan at a magnification of 5,000. Fibres of pure alumina from a similar formulation but without the silia, when heated in an identical manner gave blankets of lower resilience, and on Stereoscan examination showed surface features corresponding to the formation of large alpha alumina crystals which in many places crossed the visible surface.

EXAMPLE 24

Fibres produced as in Example 23 were heated in air for 1 hour at 1200° C and shown to contain a major delta phase of alumina with no trace of mullite or silica phases.

In comparison, a sample of commercial alumina/silica catalyst was analysed and found to have a similar composition (3.8% Si, 42.2% Al). Harshaw alumina AL-1605P-L2621-35-31 was found to give a small amount of cristobalite and a trace of mullite when fired for 1 hour at 1200° C. Furthermore, after 5 minutes at 1400° C the sample contained a major alpha alumina phase, together with theta alumina and mullite.

EXAMPLE 25

(Comparative Example)

Fibres were prepared from the following components:

200g Basic aluminium oxychloride solution (Al:Cl ratio 1.7:1, 23% $Al_2O_3$)
8.8g Silica sol ('Ludox' AM) (28.5% $SiO_2$)

The solution was evaporated down to a viscosity of 80 poise on a rotary vacuum evaporator, and spun on a centrifugal spinner at 2500 rpm through small peripheral holes to give fibres with a mean diameter of 10 microns. The fibres were dried at 80° C for 6 hours, heated in steam for 8 hours at 350° C and fired to 1000° C for ¼ hour. X-ray analysis showed that these fibres contained the eta and chi phases of alumina, but on heating in a hot-stage X-ray diffractiometer up to 1200° C, in addition to transition alumina phases, mullite was observed from 1160° C. Fibres heated to 1200° C were weak in comparison to those produced as in Example 22 and heated in a similar manner.

What we claim is:

1. A process for the preparation of a fiber comprising a metal oxide and silica comprising the steps of
   (a) providing a liquid composition having a viscosity of greater than 0.1 poise comprising an aqueous solution of a water-soluble metal compound and a water-soluble organic silicon compound which is stable to hydrolysis in the liquid composition and in which silicon atoms are attached to carbon atoms directly or through an oxygen atom and wherein the concentration of the metal compound expressed as equivalent metal oxide exceeds the concentration of the silicon compound expressed as silicon dioxide;
   (b) fiberizing the said liquid composition to form fibers; and
   (c) heating the said fibers to decompose the metal compound and the silicon compound to oxides.

2. A process as claimed in claim 1 wherein the weight ratio of metal compound expressed as equivalent metal oxide to silicon compound expressed as silicon dioxide is at leat 85:15.

3. A process as claimed in claim 1 wherein the metal of the metal compound is selected from the group consisting of aluminum, iron, zirconium, titanium, beryllium, chromium, magnesium, thorium, uranium, yttrium, nickel, vanadium, molybdenum, tungsten and cobalt.

4. A process as claimed in claim 1 wherein the metal compound is selected from the group consisting of metal hydroxide, halide, oxyhalide, carbonate, nitrate, phosphate, sulphate and salts of an organic acid.

5. A process as claimed in claim 4 wherein the salt of an organic acid is selected from the group consisting of a basic formate, acetate, oxalate and propionate.

6. A process as claimed in claim 1 wherein the metal compound is selected from the group consisting of aluminum oxychloride, basic aluminum acetate, basic alumium formate, zirconium oxychloride, basic zirconium acetate, basic zirconium nitrate and basic zirconium formate.

7. A process as claimed in claim 1 wherein the silicon compound contains a silanol or silanolate group or a water-solubilizing carbon functional group or mixtures of these groups.

8. A process as claimed in claim 1 wherein the silicon compound contains a siloxane group and a water-solubilizing carbon functional group.

9. A process as claimed in claim 8 wherein the silicon compound is a water-soluble polysiloxane-polyoxyalkylene compolymer.

10. A process as claimed in claim 9 wherein the polysiloxane and polyoxyalkylene blocks of the polysiloxane-polyoxyalkylene copolymer are linked by Si—C linkages.

11. A process as claimed in claim 9 wherein the polysiloxane block of th polysiloxane-polyoxyalkylene copolymer is a polymethylsiloxane block.

12. A process as claimed in claim 9 wherein the molecular weight of the polysiloxane block of the polysiloxane-polyoxyalkylene copolymer is from 220 to 20,000.

13. A process as claimed in claim 9 wherein the polyoxyalkylene block of the polysiloxane-polyoxyalkylene copolymer comprises oxyethylene groups.

14. A process as claimed in claim 13 wherein the ratio of carbon atoms to oxygen atoms in the oxyalkylene chain is below 3:1.

15. A process as claimed in claim 9 wherein the polyoxyalkylene block comprises additionally oxypropylene groups and the oxyethylene groups comprise at least 305 by weight of the polyoxyalkylene block.

16. A process as claimed in claim 11 wherein the ratio of polysiloxane to polyoxyalkylene is less than 2.5:1.

17. A process as claimed in claim 1 wherein the liquid composition additionally comprises a water-soluble silicon-free organic polymer.

18. A process as claimed in claim 17 wherein the organic polymer is selected from the group consisting of partially-hydrolyzed polyvinyl acetate, polyvinyl alcohol, polyvinyl pyrrolidone or polyethylene oxide.

19. A process as claimed in claim 1 wherein the fiber is dried prior to decomposition of the metal and silicon compounds to their oxides.

20. A process as claimed in claim 1 wherein the fibers are heated at a temperature of 500° to 1200° C for one minute to one hour.

21. A fiber comprising a metal oxide and silica whenever prepard by a process as claimed in claim 1.

22. A fiber as claimed in claim 21 wherein the ratio by weight of metal oxide to silica is at least 85:15.

23. A process as claimed in claim 1 wherein fiberizing is effected by extrusion of the liquid composition at a viscosity of 100 to 1000 poise through a spinneret to form a continuous filament.

24. A process as claimed in claim 23 wherein fiberizing is effected by blowing.

25. A process as claimed in claim 24 wherein the liquid composition has a viscosity of 0.1 to 100 poise.

26. A process as claimed in claim 25 wherein blowing comprises extruding the liquid composition through one or more apertures into at least one gas stream having a component of high velocity in the direction of travel of the extruded composition whereby the extruded composition is drawn down.

27. A process as claimed in claim 26 wherein the liquid composition is extruded into two gas streams which converge at or near the point when the composition is extruded from the aperture.

28. A process as claimed in claim 27 wherein the gas is air.

29. A process as claimed in claim 28 wherein the air is at a relative humidity of greater than 80%.

30. A process as claimed in claim 1 wherein the fibers are heated with steam at 250° to 500° C.

31. A process as claimed in claim 30 wherein the fibers are subjected to the action of ammonia or a volatile amine before or with the heating with steam.

32. A process as claimed in claim 31 wherein the fibers are further heated at a temperature of 1000° to 2000° C to change the crystalline form of the oxide phases present in said fibers or to sinter the same.

* * * * *